United States Patent [19]

Yamada et al.

[11] 4,448,843

[45] May 15, 1984

[54] MAGNETIC RECORDING MEDIUM

[75] Inventors: Yasuyuki Yamada; Ryuji Shirahata; Akio Yanai; Tatsuji Kitamoto, all of Kanagawa, Japan

[73] Assignee: Fuji Photo Film Co., Ltd., Kanagawa, Japan

[21] Appl. No.: 252,762

[22] Filed: Apr. 10, 1981

[30] Foreign Application Priority Data

Apr. 10, 1980 [JP] Japan .................................. 55-47176
Apr. 10, 1980 [JP] Japan .................................. 55-47177
Apr. 28, 1980 [JP] Japan .................................. 55-56425

[51] Int. Cl.³ .............................................. G11B 5/72
[52] U.S. Cl. ..................................... 428/336; 360/134; 360/135; 360/136; 427/128; 427/131; 427/132; 428/463; 428/464; 428/425.8; 428/694; 428/695; 428/900
[58] Field of Search ..................... 252/62.55; 427/131, 427/132, 128; 428/694, 695, 900, 425.8, 463, 464, 336; 360/134–136

[56] References Cited

U.S. PATENT DOCUMENTS 4,241,139 12/1980 Kubota et al. ....................... 428/413
4,260,466 4/1981 Shirahata et al. .................... 427/132
4,309,482 1/1982 Suzuki ................................. 428/695

FOREIGN PATENT DOCUMENTS 2915905 10/1979 Fed. Rep. of Germany ...... 427/131
53-20204 6/1978 Japan .................................. 427/131
2053732 2/1981 United Kingdom ................ 427/131

Primary Examiner—Ellis P. Robinson
Attorney, Agent, or Firm—Sughrue, Mion, Zinn, Macpeak & Seas

[57] ABSTRACT

A magnetic recording medium is described wherein a layer comprising mainly a polyurethane resin, vinylidene chloride copolymer, or a cellulose derivative is formed on the surface of a vapor-deposited ferromagnetic metal layer on a substrate.

9 Claims, No Drawings

MAGNETIC RECORDING MEDIUM

BACKGROUND OF THE INVENTION

This invention relates to a magnetic recording medium, and particularly to a protective layer for a magnetic recording medium of the vapor deposition type.

A magnetic recording medium of the vapor deposition type is manufactured by physical and chemical vapor deposition, such as vacuum deposition, sputtering, or ion plating, wherein a ferromagnetic metal is heated in vacuum or a gaseous atmosphere until it vaporizes and deposits physically on a support. Such magnetic recording medium constantly contacts and slides on the transport system and magnetic head in a recording/reproduction apparatus, and it must have high wear resistance, abrasion resistance and lubricity, but none of the conventional products known to date meets these requirements perfectly.

Several methods are known for providing a protective layer for improving the wear resistance of the magnetic recording medium, for example, the technique of electroplating a rhodium film, nickel film, nickel-phosphorus film or nickel-tin film, the technique of oxidizing the surface of a thin cobalt-containing ferromagnetic metal film by exposing it to a suitable temperature and moisture (Japanese Patent Publication No. 20025/67 and U.S. Pat. No. 3,353,166), the technique of contacting a thin magnetic alloy film with nitric acid, treating the same with heat to form an oxide film on the surface, and impregnating the film with a lubricant (British Pat. No. 1,265,175), and the technique of depositing the vapor of chromium on the surface of a thin ferromagnetic metal film in a suitable degree of vacuum to thereby form a layer composed of a mixture of chromium and chromium oxide (Japanese Patent Publication No. 4393/70).

Methods are also known to form a protective layer by vapor deposition, sputtering, or ion plating SiO (U.S. Pat. Nos. 3,109,746, 3,353,166, and Japanese Patent Application (OPI) No. 80102/75 (the term "OPI" as used herein refers to a "published unexamined Japanese patent application"), $SiO_2$ (Japanese Patent Application (OPI) Nos. 93404/75 and 112307/76), noble metals (Japanese Patent Application (OPI) Nos. 93604/75 and 58304/76), and metal oxides, carbides, nitrides, sulfides and fluorides (Japanese Patent Application (OPI) Nos. 104602/75, 123408/75, 146303/75, 56202/76, 21901/78, 21902/78 and 30304/78), but none of the resulting protective layers are completely satisfactory.

SUMMARY OF THE INVENTION

Therefore, the primary object of this invention is to provide a magnetic recording medium of the vapor deposition type having high wear resistance, abrasion resistance, and a good running property (referring to tape transport in a recording/reproduction apparatus).

As a result of studies to achieve this object, it has now been found that the desired magnetic recording medium can be achieved by forming a layer comprising mainly a polyurethane resin, vinylidene chloride copolymer, or a cellulose derivative on the surface of a vapor-deposited ferromagnetic metal layer on a substrate.

The reason why a protective layer comprising mainly a polyurethane resin or cellulose derivative is particularly effective has not been elucidated, but one possible reason is that it is hard and has high glass transition point (Tg). A layer comprising mainly a vinylidene chloride copolymer has a high ability to shield the ferromagnetic metal layer from gas such as oxygen, so it is expected to be more stable against oxidation than layers of other polymers of the same thickness.

DETAILED DESCRIPTION OF THE INVENTION

The polyurethane resin, the vinylidene chloride copolymer and the cellulose derivative used in this invention have an average molecular weight in the range of from about 5,000 to about 500,000, and preferably from 10,000 to 200,000.

Typical examples of the polyurethane are one prepared from a polyisocyanate and a polyester made from a polybasic organic acid and polyol, and one prepared from polyether glycol or polyoxyalkylene glycol and polyisocyanate. Preferred polyurethanes are those prepared from polyesters such as adipic acid/butanediol, adipic acid/hexanediol, adipic acid/diethylene glycol, sebacic acid/glycol, and sebacic acid/butanediol, and polyisocyanates such as toluene diisocyanate, hexamethylene diisocyanate, and diphenylmethane diisocyanate. The polyurethane described in Japanese Patent Application No. 26880/79 is also applicable. Such polyurethanes are commercially available from Nippon Polyurethane Industry Co., Ltd. under the trademarks Paraprene 22S, 26S, 22SM, 25SM, and Nipporan 2301, from Bayer AG., West Germany, under the trademark Desmolak 2100, and Morton Chemical, U.S.A., under the trademarks CA 250HV, CA275 and CA300.

The vinylidene chloride copolymer used in this invention comprises from 98 to 60 wt%, and preferably from 95 to 70 wt%, vinylidene chloride. Examples of the monomer copolymerizable with vinylidene chloride include acrylonitrile, vinyl chloride, an acrylic ester wherein the alkyl group has 1 to 6 carbon atoms, and a methacrylic ester wherein the alkyl group has 1 to 6 carbon atoms.

The cellulose derivatives used in the present invention are those having an OH group content of from 7.5% to 40%. Examples of the cellulose derivative used in this invention include nitrocellulose, cellulose acetobutyrate, cellulose acetate propionate, cellulose acetate and ethyl cellulose, which are known in the art, for example, in U.S. Pat. No. 3,630,771.

These polymers are dissolved in a solvent such as an ester, ketone, aromatic hydrocarbon, dimethylformamide (DMF), or tetrahydrofuran (THF), in case of the polyurethane; with tetrahydrofuran, methyl ethyl ketone (MEK), ethyl acetate, or cyclohexanone, in case of the vinylidene chloride copolymer; or in an ester, ketone, or alcohol, in case of the celluose derivative. The coating solution thus-formed is coated on the surface of the ferromagnetic metal layer on the substrate.

If desired, the polyurethane, cellulose derivative, and vinylidene chloride copolymer may be combined to provide a coating having improved surface properties. In this case, the major component of the protective layer may be combined with from 0.2 to 30 wt%, based on the total weight of the protective layer, of an additional component. If the content of the additional component (e.g., the cellulose derivative or vinylidene chloride copolymer when the major component is polyurethane) is too great, the resulting protective layer has low wear and abrasion resistance and a poor running property perhaps due to the decrease in the inherent properties of the major component (e.g., polyurethane).

Thus, the protective layer preferably contains at least 70 wt% of a polyurethane resin, a vinylidene chloride copolymer or a cellulose derivative.

If desired, the coating solution may contain from 0.2 to 30 wt% of a diluting agent such as a hydrocarbon (e.g., toluene, xylene or mineral spirit), a chloride (e.g., carbon tetrachloride or ethylene dichloride), or an alcohol (e.g., ethanol or isopropanol) or a suitable plasticizer to provide intimate contact with the metal layer such as dioctyl phthalate (DOP), dibutyl phthalate (DBP), triphenyl phosphate (TPP), polymeric plasticizer or thermoplastic polyurethane resin.

The object of this invention is achieved more effectively when a lubricant is incorporated into the protective layer or is coated on the protective layer. Examples of the lubricant include aliphatic acids, aliphatic acid esters, paraffin waxes, metal soaps, higher alcohols, amines of aliphatic acids, amide derivatives, fluorine compounds and silicon compounds.

To achieve the desired protecting effect and to prevent output drop that is caused by spacing loss due to the gap between the magnetic recording surface and magnetic head, the protective layer preferably has a thickness of from about 0.002 to 0.3 $\mu$m, and preferably from 0.005 to 0.2 $\mu$m.

The thin ferromagnetic metal film used in this invention is prepared by vapor deposition of a metal such as Fe, Co or Ni, or a ferromagnetic alloy such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Mn-Bi, Mn-Sb, Mn-Al, Fe-Cr, Co-Cr, Ni-Cr, Fe-Co-Cr and Fe-Co-Ni-Cr. The magnetic film must be thick enough to provide an output necessary for a magnetic recording medium and must be thin enough to achieve the desired high-density recording, so generally the film has a thickness between 0.02 and 5.0 $\mu$m, and preferably between 0.05 and 2 $\mu$m. The vapor deposition of such a metal or alloy can be effected by the procedure as disclosed in U.S. Pat. No. 3,342,632.

Examples of the substrate or base include polymeric bases such as polyester, polyethylene terephthalate, polyimide, polyamide, polyamideimide, polyvinyl chloride, triacetyl cellulose, polycarbonate and polyethylene terephthalate, and metal substrates such as Al, Al alloy, Ti, Ti alloy and stainless steel. Another example of the substrate is magnetic tape composed of a support coated with a layer of finely divided ferromagnetic material and a binder.

Further, when the protective layer is hard in nature, a polymer layer having a relatively low Young's modulus, i.e., about 10 to about 500 kg/mm$^2$, can be provided as a primer between the ferromagnetic layer and the protective layer in order to absorb external force whereby adhesion of the protective layer to the ferromagnetic layer can be improved. Examples of such polymers are polyesters, vinylidene chloride/acrylonitrile copolymers and the like.

This invention is now described in greater detail by reference to the following examples, which are provided here for illustrative purposes only, and are not intended to limit the scope of the invention. In the examples, all parts are by weight.

EXAMPLE 1

A thin layer of Co-Ni was vapor-deposited in a continuous manner at $6 \times 10^{-5}$ Torr on a polyethylene terephthalate film (15$\mu$ thick) in a thickness of 1,500 Å. That thin layer was further coated with a protective layer from a coating solution of the following composition to provide a layer having a dry thickness of 0.1$\mu$ by gravure coating.

| Composition of Coating Solution | |
|---|---|
| Polyurethane resin (Desmolak 2100 of Bayer AG.) | 100 parts |
| Methyl isobutyl ketone (MIBK)/ methyl ethyl ketone (MEK)(1/1) | 1,000 parts |

Before application of the coating solution, the thin layer of Co-Ni was coated with a primer to form a primer layer having a dry thickness of 0.1 $\mu$m from a solution in methylene dichloride of an amorphous polyester resin prepared from terephthalic acid.

The magnetic recording medium obtained was slit into tape sample No. 1 ½ inch wide, which was run on a small-scale video tape recorder [Video Home System (VHS) VTR deck] to check its abrasion resistance, wear resistance, and running property. Abrasion resistance of the magnetic recording medium was evaluated by counting the number of abrasions developed after 20 repeated runs. Wear resistance was evaluated by checking the wear of the tape surface after 20 repeated runs. Running property was checked by determining the dynamic friction coefficient from the tensions measured at both the incoming and outgoing ends of the cylinder. The results are shown in Table 1.

TABLE 1

| Sample No. | Virgin Tape | Abrasion Resistance After 5 Runs | After 10 Runs | After 20 Runs | Wear Resistance After 20th Run | Running Property (dynamic) Friction Coefficient (25° C., 60% RH) 1st Run | 5th Run | 10th Run | 20th Run |
|---|---|---|---|---|---|---|---|---|---|
| 1 | 0 | 0 | one shallow abrasion | one shallow abrasion | good | 0.24 | 0.22 | 0.21 | 0.21 |

Table 1 shows the test sample has high resistance to abrasion and wear, and achieves substantially stable running (i.e., there is little change in the dynamic friction coefficient).

EXAMPLES 2 TO 5

Tape sample Nos. 2 to 5 were prepared analogous to the procedure of Example 1, using a composition of the vapor-deposited film, base, and protective layer, as described in Table 2 below. In these Examples, the protective layer was coated in the same thickness as that of Example 1 (0.1$\mu$ dry thickness).

TABLE 2

| Sample | Vapor-Deposited Film and Base | Composition of Protective Layer | |
|---|---|---|---|
| 2 | Co film (thickness = 1,000 Å) | Polyurethane resin (Desmolak 2100) | 100 parts |
| | Polyimide base (thickness = 12 μm) | Butyl acetate | 0.4 part |
| | | MEK/Toluene (1/1) | 1,000 parts |
| 3 | Co—V film (V = 10 wt %, thickness = 1,200 Å) | Polyurethane resin (Paraprene 22S of Nippon Polyurethane Industry Co., Ltd.) | 100 parts |
| | Polyethylene terephthalate base (thickness = 16 μm) | MEK/Cyclohexanone (3/7) | 1,000 parts |
| 4 | Co—Fe Film (Fe = 15 wt %, thickness = 1,500 Å) | Polyurethane resin (Paraprene 22S of Nippon Polyurethane Industry Co., Ltd.) | 90 parts |
| | Polyethylene terephthalate base (thickness = 20 μm) | Nitrocellulose (RS 1/2) | 10 parts |
| | | MEK/Cyclohexanone (3/7) | 1,000 parts |
| 5 | Co—Cr film (Cr = 2 wt %, thickness = 1,200 Å) | Polyurethane resin (Paraprene 22S of Nippon Polyurethane Industry Co., Ltd.) | 100 parts |
| | Polyethylene terephthalate base (thickness = 20 μm) | Oleic acid | 0.4 part |
| | | MEK/Cyclohexanone (3/7) | 1,000 parts |

COMPARATIVE EXAMPLES A–C

Comparative Samples A, B, and C were prepared analogous to the procedure of Example 1, using a composition of the vapor-deposited film, base, and protective coating as described in Table 3 below.

TABLE 3

| Sample No. | Vapor-Deposited Film and Base | Composition of Protective Layer |
|---|---|---|
| A | The same as in Sample No. 1. | No protective layer |
| B | The same as in Sample No. 2. | 1 wt % solution of butyl stearate (as liquid lubricant) in MEK/MIBK (1/1) was applied and dried. Coating weight of butyl stearate = 20 mg/m² |
| C | The same as in Sample No. 3. | Aliphatic acid modified silicone oil (as liquid lubricant) was applied as in Sample B to give a coating weight of 15 mg/m². |

The wear resistance, abrasion resistance, and running property of Sample Nos. 2 to 5 and Samples A, B, and C were evaluated by the same methods as in Example 1. The results are shown in Table 4 below.

TABLE 4

| Sample No. | Abrasion Resistance | | | | Wear Resistance After 20 Runs | Running Property (dynamic friction coefficient) (25° C. 65% RH) | | | |
|---|---|---|---|---|---|---|---|---|---|
| | Virgin Tape | After 5 Runs | After 10 Runs | After 20 Runs | | 1st Run | 5th Run | 10th Run | 20th Run |
| 2 | 0 | 0 | 0 | 1 shallow abrasion | Good | 0.22 | 0.21 | 0.20 | 0.19 |
| 3 | 0 | 0 | 1 shallow abrasion | 1 shallow abrasion | " | 0.20 | 0.21 | 0.20 | 0.19 |
| 4 | 0 | 0 | 0 | 1 shallow abrasion | " | 0.22 | 0.21 | 0.20 | 0.21 |
| 5 | 0 | 0 | 0 | 0 | " | 0.22 | 0.19 | 0.18 | 0.18 |
| A | 0 | 10 deep abrasions | 23 deep abrasions | 49 deep abrasions | Worn too greatly to be evaluated | 0.21 | 0.22 | 0.29 | 0.45 |
| B | 0 | 8 deep abrasions | 19 deep abrasions | 36 deep abrasions | Poor | 0.23 | 0.22 | 0.21 | 0.22 |
| C | 0 | 7 deep abrasions | 15 deep abrasions | 41 deep abrasions | " | 0.20 | 0.19 | 0.21 | 0.20 |

EXAMPLE 6

Sample No. 6 was prepared by repeating the procedure of Example 1, except that a coating solution of the following composition was used to provide the protective layer.

| Coating Solution | |
|---|---|
| Vinylidene chloride/acrylonitrile (weight ratio = 87:13) copolymer | 100 parts |
| MIBK/MEK (2/8) | 1,000 parts |

The abrasion resistance and running property of the sample were evaluated by the same method as in Example 1. The results are shown in Table 5 below.

TABLE 5

| Sample No. | Abrasion Resistance | | | | Running Property (dynamic friction coefficient) (25° C. 60% RH) | | | |
|---|---|---|---|---|---|---|---|---|
| | Virgin Tape | After 5 Runs | After 10 Runs | After 20 Runs | 1st Run | 5th Run | 10th Run | 20th Run |
| 6 | 0 | 0 | 1 shallow | 2 shallow | 0.28 | 0.27 | 0.25 | 0.25 |

TABLE 5-continued

| Sample No. | Abrasion Resistance | | | | Running Property (dynamic friction coefficient) (25° C. 60% RH) | | | |
|---|---|---|---|---|---|---|---|---|
| | Virgin Tape | After 5 Runs | After 10 Runs abrasion | After 20 Runs abrasions | 1st Run | 5th Run | 10th Run | 20th Run |

Table 5 shows that the sample had good abrasion resistance and achieved stable running (i.e., little change in the dynamic friction coefficient).

EXAMPLES 7 TO 10

Sample Nos. 7 to 10 were prepared analogous to the procedure of Example 6, using a composition of the vapor-deposited film, base, and protective layer, as described in Table 6 below.

TABLE 6

| Sample | Vapor-deposited Film and Base | Composition of Protective Layer | |
|---|---|---|---|
| 7 | Co film (thickness = 1,000 Å) | Vinylidene chloride/vinyl chloride (78/22) copolymer | 95 parts |
| | Polyimide base (thickness = 12 μm) | | |
| | | Nitrocellulose (RS 1/2) | 5 parts |
| | | MEK/THF (1/1) | 1,000 parts |
| 8 | Co—V film (V = 10 wt %, thickness = 1,200 Å) | Vinylidene chloride/ethylmethacrylate (95/5 wt %) copolymer | 100 parts |
| | Polyethylene terephthalate base (thickness = 16 μm) | Oleic acid | 0.5 part |
| | | MEK/MIBK (7/3) | 1,000 parts |
| 9 | Co—Fe film (Fe = 15 wt %, thickness = 1,500 Å) | Vinylidene chloride/acrylonitrile (80/20 wt %) copolymer | 90 parts |
| | Polyethylene terephthalate base (thickness = 20 μm) | Vinyl chloride acetate resin (MPR-TA of Nisshin Chemical Industry Co., Ltd.) | 10 parts |
| | | THF/Toluene (1/1) | 1,000 parts |
| 10 | C0—Cr film (Cr = 2 wt %, thickness = 1,200 Å) | Vinylidene chloride/acrylonitrile (80/20 wt %) copolymer | 100 parts |
| | Polyethylene terephthalate base (thickness = 20 μm) | THF/Toluene (1/1) | 1,000 parts |

COMPARATIVE EXAMPLES D-F

Comparative Samples D, E, and F were prepared analogous to the procedure of Example 6, using a composition of the vapor-deposited film, base, and protective coating as described in Table 7 below.

TABLE 7

| Sample No. | Vapor-Deposited Film and Base | Composition of Protective Layer |
|---|---|---|
| D | The same as in Example 6. | No protective layer |
| E | The same as in Example 6. | 0.2 wt % solution of butyl stearate (as liquid lubricant) in MEK/MIBK was applied and dried. Coating weight of butyl stearate = 20 mg/m² |
| F | The same as in Example 8. | Aliphatic acid modified silicone oil (as liquid lubricant) was applied as in Sample B to give a coating weight of 15 mg/m². |

The abrasion resistance and running property of Sample Nos. 7 to 10 and Comparative Samples D to F were evaluated by the same methods as in Example 1. The results are shown in Table 8 below.

TABLE 8

| Sample No. | Abrasion Resistance | | | | Running Property (dynamic friction coefficient) | | | |
|---|---|---|---|---|---|---|---|---|
| | Virgin Tape | After 5 Runs | After 10 Runs | After 20 Runs | 1st Run | 5th Run | 10th Run | 20th Run |
| 7 | 0 | 0 | 1 shallow abrasion | 1 shallow abrasion | 0.27 | 0.25 | 0.24 | 0.24 |
| 8 | 0 | 0 | 1 shallow abrasion | 2 shallow abrasions | 0.28 | 0.26 | 0.25 | 0.25 |
| 9 | 0 | 0 | 0 | 1 shallow abrasion | 0.29 | 0.27 | 0.25 | 0.25 |
| 10 | 0 | 0 | 0 | 1 shallow abrasion | 0.28 | 0.25 | 0.25 | 0.25 |
| D | 0 | 8 deep abrasions | 20 deep abrasions | 50 deep abrasions | 0.29 | 0.30 | 0.41 | 0.48 |
| E | 0 | 7 deep abrasions | 15 deep abrasions | 40 deep abrasions | 0.27 | 0.27 | 0.28 | 0.27 |
| F | 0 | 6 deep abrasions | 15 deep abrasions | 40 deep abrasions | 0.26 | 0.25 | 0.25 | 0.26 |

The results of Table 8 show that the magnetic tape samples of this invention have high abrasion resistance and good running property. More abrasions developed on Samples D, E, and F as the number of runs increased, but very few abrasions developed on Sample Nos. 7 to 10. The dynamic friction coefficient of Sample D, having no protective lubricant, increased as the number of tape runs increased, but no great increase occurred in the dynamic friction coefficient of Samples E and F. However, both Samples E and F wore greatly due to their poor abrasion resistance.

EXAMPLE 11

Sample No. 11 was prepared by repeating the procedure of Example 1, except that a coating solution of the following composition was used to provide a protective layer.

| Coating Solution | |
|---|---|
| Nitrocellulose (RS ½) | 80 parts |
| DOP (dioctyl phthalate) | 20 parts |
| MIBK/MEK (1/1) | 1,000 parts |

The abrasion resistance, wear resistance and running property of the samples were evaluated by the same methods as in Example 1. The results are shown in Table 9.

TABLE 9

| | Abrasion Resistance | | | Wear Resistance | Running Property (dynamic friction coefficient) (25° C. 65% RH) | | | |
|---|---|---|---|---|---|---|---|---|
| Sample No. | Virgin Tape | After 5 Runs | After 10 Runs | After 20 Runs | After 20 Runs | 1st Run | 5th Run | 10th Run | 20th Run |
| 11 | 0 | 0 | 1 shallow abrasion | 1 shallow abrasion | Good | 0.22 | 0.22 | 0.21 | 0.20 |

Table 9 shows that the magnetic tape samples of this invention have high resistance to abrasion and wear and achieve stable running (i.e., little change in the dynamic friction coefficient).

EXAMPLES 12 TO 15

Sample Nos. 12 to 15 were prepared analogous to the procedure of Example 11, using a composition of the vapor-deposited film, base, and protective layer as described in Table 10 below.

TABLE 10

| Sample | Vapor-Deposited Film and Base | Composition of Protective Layer | |
|---|---|---|---|
| 12 | Co film (thickness = 1,000 Å) | Nitrocellulose (RS 20) | 75 parts |
| | Polyimide base (thickness = 12 μm) | Butylene diadipate polyurethane (Mn 15,000) | 25 parts |
| | | MEK/Toluene (1/1) | 1,000 parts |
| 13 | Co—V film (V = 10 wt %, thickness = 1,2000 Å) | Cellulose acetate butyrate (½ sec) | 90 parts |
| | Polyethylene terephthalate base (thickness = 16 μm) | Vinyl acetate resin (degree of polymerization = 450) | 10 parts |
| | | Cyclohexanone/MEK (1/1) | 1,000 parts |
| 14 | Co—Fe film (Fe = 15 wt %, thickness = 1,500 Å) | Nitrocellulose (H 1/2) | 82 parts |
| | | DBP | 18 parts |
| | Polyethylene terephthalate base (thickness = 20 μm) | Dimethyl polysiloxane | 0.5 part |
| | | Butyl acetate/ethyl acetate (1/1) | 1,000 parts |
| 15 | Co—Cr film (Cr = 2 wt %, thickness = 1,200 Å) | Cellulose acetate propionate (½ sec) | 85 parts |
| | | Triphenyl phosphate | 15 parts |
| | Polyethylene terephthalate base (thickness = 20 μm) | Oleic acid | 0.5 part |
| | | MEK/MIBK (1/1) | 1,000 parts |

COMPARATIVE EXAMPLES G-I

Comparative Samples G, H, and I were prepared analogous to the procedure of Example 11, using a composition of the vapor-deposited film, base, and protective layer, see Table 11 below.

TABLE 11

| Sample No. | Vapor-Deposited Film and Base | Composition of Protective Layer |
|---|---|---|
| G | The same as in Sample No. 11. | No protective layer |
| H | The same as in Sample No. 12. | 1 wt % solution of butyl stearate (as liquid lubricant) in MEK/MIBK (1/1) was applied and dried. Coating weight of butyl stearate = 20 mg/m². |
| I | The same as in Sample No. 13. | Aliphatic acid modified silicone oil (as liquid lubricant) was applied as in Sample H to give a coating of 15 mg/m². |

The abrasion resistance, wear resistance, and running property of Sample Nos. 12 to 15 and Comparative Examples G to I were evaluated by the same methods as in Example 1. The results are shown in Table 12.

TABLE 12

| | Abrasion Resistance | | | | | Running Property (dynamic friction coefficient) (25° C., 65% RH) | | | |
|---|---|---|---|---|---|---|---|---|---|
| Sample No. | Virgin Tape | After 5 Runs | After 10 Runs | After 20 Runs | Wear Resistance After 20 Runs | 1st Run | 5th Run | 10th Run | 20th Run |
| 12 | 0 | 0 | 0 | 1 shallow abrasion | Good | 0.20 | 0.20 | 0.19 | 0.19 |
| 13 | 0 | 0 | 1 shallow | 1 shallow | " | 0.19 | 0.18 | 0.19 | 0.19 |

TABLE 12-continued

| Sample No. | Abrasion Resistance | | | | Wear Resistance After 20 Runs | Running Property (dynamic friction coefficient) (25° C., 65% RH) | | | |
| --- | --- | --- | --- | --- | --- | --- | --- | --- | --- |
| | Virgin Tape | After 5 Runs | After 10 Runs | After 20 Runs | | 1st Run | 5th Run | 10th Run | 20th Run |
| 14 | 0 | 0 | abrasion 0 | abrasion 1 shallow abrasion | " | 0.21 | 0.20 | 0.19 | 0.19 |
| 15 | 0 | 0 | 0 | 0 | " | 0.22 | 0.19 | 0.18 | 0.18 |
| G | 0 | 10 deep abrasions | 23 deep abrasions | 49 deep abrasions | Worn too greatly to be evaluated | 0.20 | 0.23 | 0.28 | 0.41 |
| H | 0 | 8 deep abrasions | 19 deep abrasions | 36 deep abrasions | " | 0.20 | 0.21 | 0.21 | 0.21 |
| I | 0 | 7 deep abrasions | 15 deep abrasions | 41 deep abrasions | " | 0.18 | 0.19 | 0.21 | 0.20 |

The results of Table 12 show that the magnetic tape samples according to the present invention have high resistance to abrasion and wear and excellent running property.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising
 (a) a support,
 (b) a vapor-deposited ferromagnetic metal layer on said support(a), and
 (c) a protective layer comprising mainly one of (i) a polyurethane resin, (ii) a vinylidene chloride copolymer or (iii) a cellulose derivative on the surface of said vapor-deposited ferromagnetic metal layer (b), said protective layer having a thickness of from about 0.002 to 0.3 µm.

2. A magnetic recording medium as in claim 1, wherein the protective layer (c) has a thickness of from about 0.005 to 0.2 µm.

3. A magnetic recording medium as in claim 1, or 2, wherein the protective layer (c) comprises mainly a polyurethane, and from 0.2 to 30 wt% of a vinylidene chloride copolymer or cellulose derivative, based on the total weight of the protective layer, as an additional component thereof.

4. A magnetic recording medium as in claim 1, or 2 wherein the protective layer (c) comprises mainly a polyurethane resin having an average molecular weight in the range of from 5,000 to 500,000.

5. A magnetic recording medium as in claim 4, wherein the average molecular weight is from 10,000 to 200,000.

6. A magnetic recording medium as in claim 1, or 3, wherein the protective layer (c) comprises mainly a vinylidene chloride copolymer comprising from 98 to 60 wt% vinylidene chloride.

7. A magnetic recording medium as in claim 6, wherein the vinylidene chloride copolymer comprises from 95 to 70 wt% vinylidene chloride.

8. A magnetic recording medium as in claim 1, or 2, wherein the protective layer (c) contains a lubricant.

9. A magnetic recording medium as in claim 1, or 2, comprising a primer layer (d) between the ferromagnetic metal layer (b) and the protective layer (c).

* * * * *